United States Patent [19]

Ciocca et al.

[11] 4,451,334
[45] May 29, 1984

[54] MULTI-EFFECT ROTARY DISTILLATION PROCESS

[75] Inventors: Joseph A. Ciocca; Gregory W. Knowles, both of Huntington, N.Y.

[73] Assignee: Grumman Allied Industries, Inc., Bethpage, N.Y.

[21] Appl. No.: 320,100

[22] Filed: Nov. 10, 1981

[51] Int. Cl.³ .......................... B01D 1/26; B01D 3/08
[52] U.S. Cl. ...................................... 203/11; 203/25; 203/72; 159/6.1; 159/18; 159/20 R; 202/174; 202/205; 202/236
[58] Field of Search ...................... 203/10, 11, 89, 72, 203/25, DIG. 1, 91; 202/174, 236, 180, 205, 234; 159/5, 6 R, 6.1, 6 W, 6 WH, 6.2, 6.3, 18, 20 R, 49

[56] References Cited

U.S. PATENT DOCUMENTS

| | | | |
|---|---|---|---|
| 2,180,052 | 11/1939 | Hickman et al. | 202/205 |
| 2,210,926 | 8/1940 | Hickman | 203/89 |
| 2,210,927 | 8/1940 | Hickman | 203/89 |
| 2,210,928 | 8/1940 | Hickman | 202/236 X |
| 2,298,377 | 10/1942 | Hickman | 203/72 |
| 2,308,008 | 1/1943 | Hickman | 202/236 |
| 2,445,350 | 7/1948 | Ginnings | 202/234 |
| 2,551,815 | 5/1951 | Schulz | 203/89 X |
| 2,734,023 | 2/1956 | Hickman | 203/89 X |
| 2,894,879 | 7/1959 | Hickman | 202/174 |
| 2,899,366 | 8/1959 | Hickman | |
| 2,999,796 | 9/1961 | Bromley | 202/236 |
| 3,136,707 | 6/1964 | Hickman | 203/89 X |
| 3,271,271 | 9/1966 | Watt | 202/173 |
| 3,640,330 | 2/1972 | Javet | 202/236 |
| 3,725,209 | 4/1973 | Rosa | 203/11 |
| 3,764,483 | 10/1973 | Tleimat | 202/236 |
| 3,788,954 | 1/1974 | Cantrell | 203/89 |
| 4,054,484 | 10/1977 | Linder et al. | 202/236 |

FOREIGN PATENT DOCUMENTS 1162054  3/1958 France ............................... 202/236
549519 11/1942 United Kingdom ............... 202/236

*Primary Examiner*—Wilbur L. Bascomb, Jr.
*Attorney, Agent, or Firm*—Morgan, Finnegan et al.

[57] ABSTRACT

A thermally driven multi-effect distillation process and apparatus are disclosed in which liquid is introduced into a plurality of evaporating and condensing stages or chambers while heat energy is passed through the stages or chambers in a direction countercurrent to the direction of flow of the liquid which undergoes evaporation to form condensate and distilland in each stage or chamber while transferring the heat of condensation to the next downstream stage or chamber and maintaining a minimum temperature differential between stages or chambers, and separately removing condensate and distilland from each stage or chamber while rotating the stages or chambers about an axis passing through the points of introduction thereto of the liquid and heat energy.

Generally the apparatus comprises a plurality of adjacent evaporation and condensation chambers and means for introducing liquid and heat energy thereto in countercurrent directions. The walls of the chambers, formed of spaced heat conductive sheets, act as heat transfer means. Common walls of adjoining chambers provide condensing and evaporating surfaces on the opposite sides. The chambers are provided with means for separate removal of condensate and distilland and means for rotating them about an axis passing through the points of introduction of liquid and heat energy thereto.

3 Claims, 7 Drawing Figures

MULTI-EFFECT ROTARY DISTILLATION PROCESS

This invention relates to a multi-effect distillation process and apparatus for accomplishing the same.

More particularly, the invention relates to a thermally driven multi-effect distillation process and apparatus which can be employed in a wide variety of applications such as, for example, the desalting of sea water, toxic liquid waste concentration, alcohol production and the like.

BACKGROUND OF THE INVENTION

A wide variety of single and multi-effect distillation processes and apparatus for achieving the same are known. For example, U.S. Pat. No. 2,180,052 discloses a vacuum distillation apparatus in which a centrifugal vaporizing surface and a stationary condensing surface are employed. U.S. Pat. No. 2,210,926 deals with a vacuum distillation process in which materials, such as fish oils, are heated and when in such physical state subjected to rapid vaporization. U.S. Pat. Nos. 2,210,927 and 2,210,928 deal with a vacuum distillation process and apparatus in which material to be distilled is subjected to heat and placed under a high vacuum in such a form or condition so that rapid vaporization takes place over a short path and by means of force greater than, or means other than gravity, thereby avoiding substantial decomposition of the distillate. The apparatus for accomplishing the process generally comprises separate rotating vaporizing and condensing surfaces. A somewhat similar apparatus and process is shown in U.S. Pat. No. 2,298,377 except that the vaporizing surface is heated to different temperatures at different areas thereof and the process deals with separately condensing vapor fractions from different areas of the vaporizing surface on an unheated condensing surface. A modified but somewhat similar device is shown in U.S. Pat. No. 2,308,008 except that a hot condensing surface, as well as a hot vaporizing surface, is employed.

In U.S. Pat. No. 2,551,815 a multi-effect centrifugation apparatus and process is disclosed in which material to be separated is passed through a series of centrifugation effects, the lighter fraction removed in each effect being passed continuously to a succeeding effect richer in a lighter component and the heavier fraction removed in each effect being passed continuously to a preceding effect richer in a heavier component. On the other hand, U.S. Pat. No. 2,734,023 deals with a compression distillation method and apparatus in which the resistance to the flow of heat through evaporating and/or condensing films and the resistance to separation of vapor from the distilland are greatly reduced. A somewhat similar device is disclosed in U.S. Pat. No. 2,894,879 for distilling liquid such as sea water by using rotary phase separator barriers of the type described in U.S. Pat. No. 2,734,023 but connected in series. Still another compression still is disclosed in U.S. Pat. No. 2,899,366 in which a combination of degassing and purging means for removal of interfering gases is employed.

U.S. Pat. No. 2,999,796 deals with a multiple and centrifugal separator employing stacked evaporating chambers mounted for rotation on a vertical axis and including an enclosing vacuum chamber disposed around the stacked evaporating chambers.

U.S. Pat. No. 3,136,707 discloses a phase separation barrier distillation apparatus in which means, such as spreaders or wipers are employed to spread and remove liquid from evaporating and condensing surfaces. U.S. Pat. No. 3,271,271 discloses a still which also employs spreading and wiping means. On the other hand, U.S. Pat. No. 3,788,954 discloses an interphase mass transfer process and apparatus in which the components of a fluid having different vapor pressure are transferred between their liquid and vapor phases and in which the liquid and vapor phases are in thermodynamic equilibrium.

British Pat. No. 549,519 discloses a high vacuum distillation apparatus which has highly polished vaporizing and condensing surfaces that are separated by a substantially unobstructed space and French Pat. No. 1,162,054 discloses a distillation process in which liquid to be distilled is passed into a zone where energy is added thereto and then discharged from that zone in the form of a thin film which is then contacted with a current of distilling vapor that is passed across the surface of the film.

While the various processes and apparatus briefly described above have been generally useful and acceptable in various areas of technology where liquid separation is employed, there still exists a need for even further types of such distillation processes and apparatus which, while exhibiting great efficiency, are relatively simple in operation and physical structure and, at the same time, advantageous in terms of manufacturing and operating costs. The present invention fulfills such a need.

BRIEF STATEMENT OF THE INVENTION

In accordance with the invention, there is provided a thermally driven, multi-effect distillation process and apparatus for carrying out the same, process comprising the steps of (a) introducing liquid to be distilled into a plurality of evaporating and condensing stages while passing heat energy through the plurality of stages in a direction countercurrent to the flow of the liquid into the stages, (b) evaporating the liquid in each of the stages to form condensate and distilland thereof while transferring the heat of the condensation therefrom to the next downstream evaporating and condensing stage and while maintaining a minimum temperature differential between the plurality of stages, and (c) separately removing the condensate and the distilland from each of the stages while rotating the stages about an axis which passes through the points of introduction to the stages of the liquid to be distilled and the heat energy, the speed of rotation being at least sufficient to generate a centrifugal force to disperse thin films of distilland and to collect condensate.

Multi-effect rotary distillation apparatus for achieving the described process comprises a plurality of adjacent evaporation and condensation chambers, means for introducing liquid to be distilled into the chambers in one direction and means for introducing heat energy to the chambers in a direction countercurrent to the direction of the liquid to be distilled, the walls of the evaporation and condensation chambers being formed of spaced heat conductive sheets, each sheet forming a heat transfer means and a common wall between adjoining chambers and providing a condensing surface on the side facing towards the means for introducing heat energy to the chambers and an evaporating surface on the side facing towards the means for introducing liquid to be distilled into the chambers, means connected to the chambers for separately removing condensate and distilland therefrom and shaft means connected to the chambers for rotating the chambers about an axis which passes through the points of introduction to the chambers of the liquid to be distilled and the heat energy.

THE DRAWINGS

In order to more fully describe the inventive process and apparatus of this invention, reference is directed to the accompanying Drawings which are to be taken in conjunction with the following description and wherein.

Figure 6:
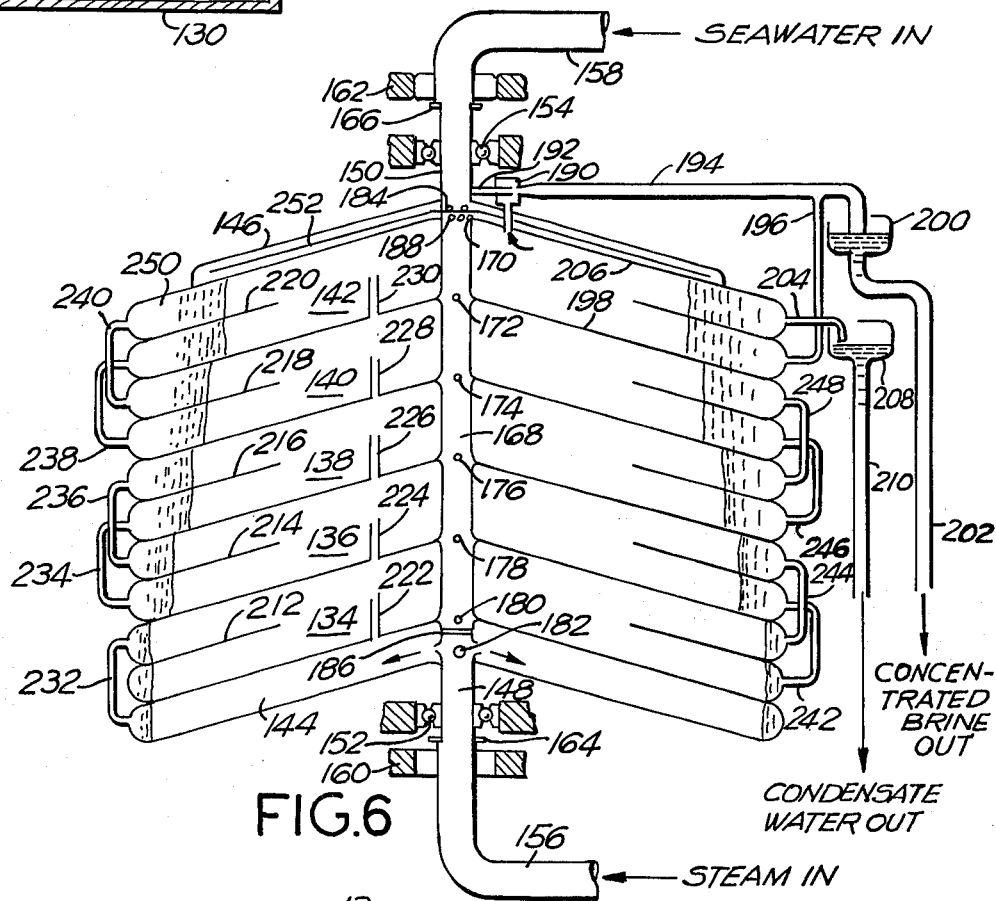
Figure 7:
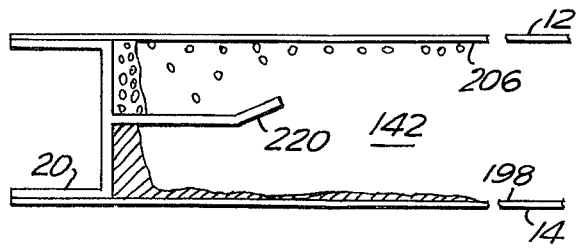

FIG. 6 is a diagrammatic illustration of a preferred embodiment of a multi-effect rotary distillation unit in accordance with the invention showing the liquid and heat energy flow paths with the unit being arranged in a vertical disposition; and FIG. 7 is a diagrammatic illustration of a typical evaporation and condensation chamber according to the invention as employed in a unit arranged in a vertical disposition as shown in FIG. 6.

DESCRIPTION OF THE PREFERRED EMBODIMENTS

Although the process and apparatus of this invention are particularly described hereinbelow as they are utilized in the desalination of sea water for purposes of simplicity, it is to be understood that the process and apparatus are not intended to be so limited.

The thermally driven multi-effect distillation process of this invention utilizes thin film evaporating and condensing layers in a plurality of stages with substantially all of the heat of condensation being transferred to the subsequent downstream or succeeding stages. Consequently, at most only a very small temperature differential (about 3° F.) exists within each recuperating stage as compared to the previous foregoing stage and successive downstream stage. The maintenance of substantially uniform temperature, or at most only a very small differential in temperature (about 3° F.) in one stage as compared to the others, in accordance with the process, permits the maximizing of the number of stages for a given terminal temperature difference, that is from heat source to heat sink. Consequently, the resulting heat energy loss per unit of condensate produced is minimized.

Figure 1:
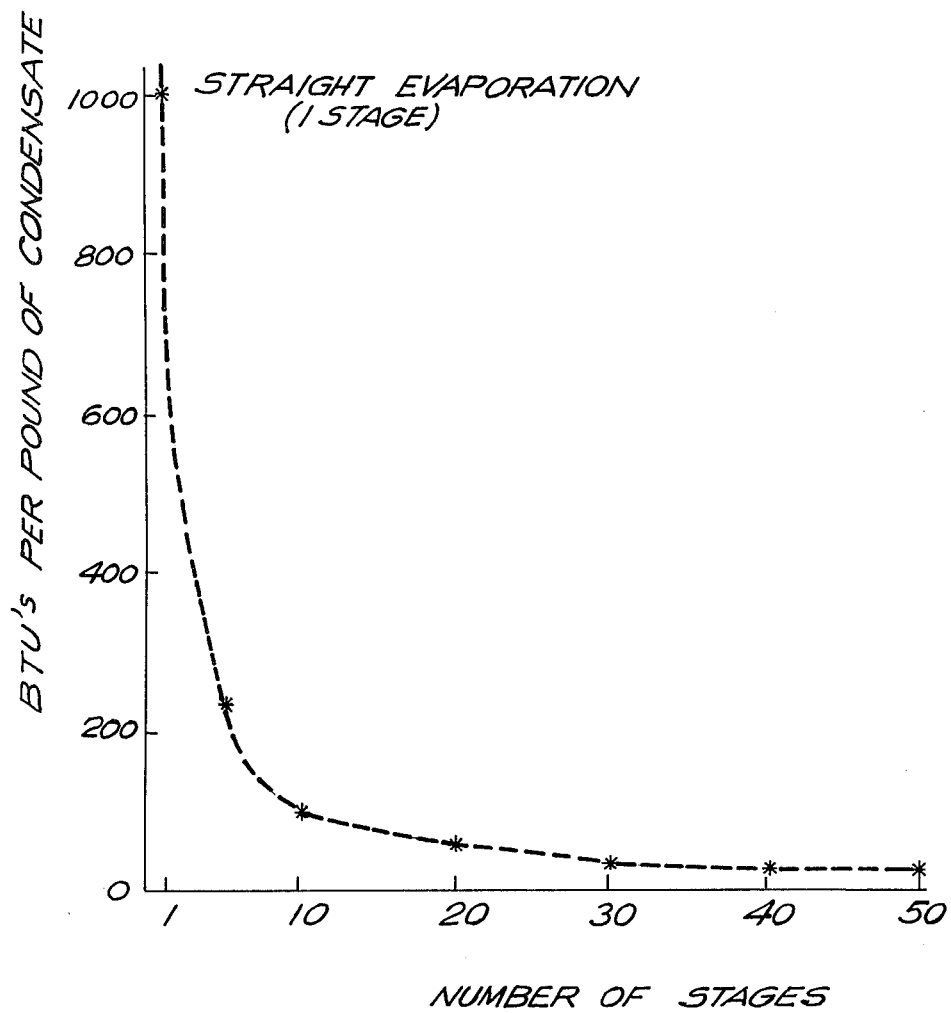
FIG. 1 is a graph illustrating the energy requirement for the multi-stage distillation process of the invention when employing an apparatus in accordance therewith.

In a straight or single-effect evaporation process, the amount of energy required to evaporate one pound of a fluid is equal to its heat of vaporization. In achieving such a process, heat is added to the evaporator of a suitable device, vapor is generated from the fluid and transported to a condensor where the vapor is condensed to form the condensate. Heat generated by condensation is then generally dumped into a nonrecoverable heat sink. On the other hand, in multi-effect processes the heat of vaporization is subsequently employed to evaporate liquid in the second to the Nth stage of the processes. In multi-effect processes the energy required per pound of condensate to be generated is inversely proportional to the number of evaporating and condensing stages. The number of stages that can be achieved in presently known pool boiling equipment is limited by the temperature differences between each stage, being typically in a range of from about 10° F. to 25° F., and, as well, limited by the overall terminal temperature difference at each end of the process. In contrast, employing thin evaporating and condensing films in accordance with the inventive process in order to substantially maintain, or at most minimize inner stage temperature differentials, makes the instant process well suited to employment in situations where low terminal temperature differentials are encountered, such as, for example, where waste heat or solar energy is utilized as the driving heat force in the desalination of sea water. Moreover, as may be seen by reference to FIG. 1, the multi-effect distillation energy requirement for carrying out the desalination of sea water in accordance with the instant process, using steam as the heat source, for example, is shown to be reduced to 33 Btu/lb of condensate produced by maximizing of the stages to 30 in number while, in contrast, a single stage evaporation to accomplish the same result requires 1000 Btu/lb, that is the amount energy required to evaporate 1 pound of water being 1000 Btu/hr. In accordance with the instant process, this result is achievable with reasonably relatively small terminal temperature differences of about 100° F., that is about 3° F. per stage, and results in economically feasible production of fresh water using steam as a source of heat. Energy reduction is even greater, of course, where a fossil fuel is used 25 the heat source, since higher terminal temperature differences and a greater number of stages can be achieved for the same 3° F. per stage condition.

Keeping the discussion in mind, it is to be understood, therefore, that the instant process may be more succinctly stated to be a thermally driven multi-effect distillation process comprising the steps of: introducing liquid to be distilled into a plurality of evaporating and condensing stages and forming thin film evaporating and condensing layers of the liquid in the plurality of stages while passing heat energy through the plurality of stages in a direction countercurrent to the flow of the liquid into the stages, (b) evaporating the liquid in each of the stages, forming condensate and distilland thereof while transferring substantially all of the heat of evaporation therefrom to the next downstream evaporating and condensing stage and while maintaining a minimum temperature differential of about 3° F. per stage, between the plurality of stages, and (c) separately removing condensate and distilland from each of the stages while rotating the stages about an axis which passes through the points of introduction to the stages of the liquid to be distilled and the heat energy, the speed of rotation being at least sufficient to generate a centrifugal force to disperse thin films of distilland and to collect condensate.

Figure 2:
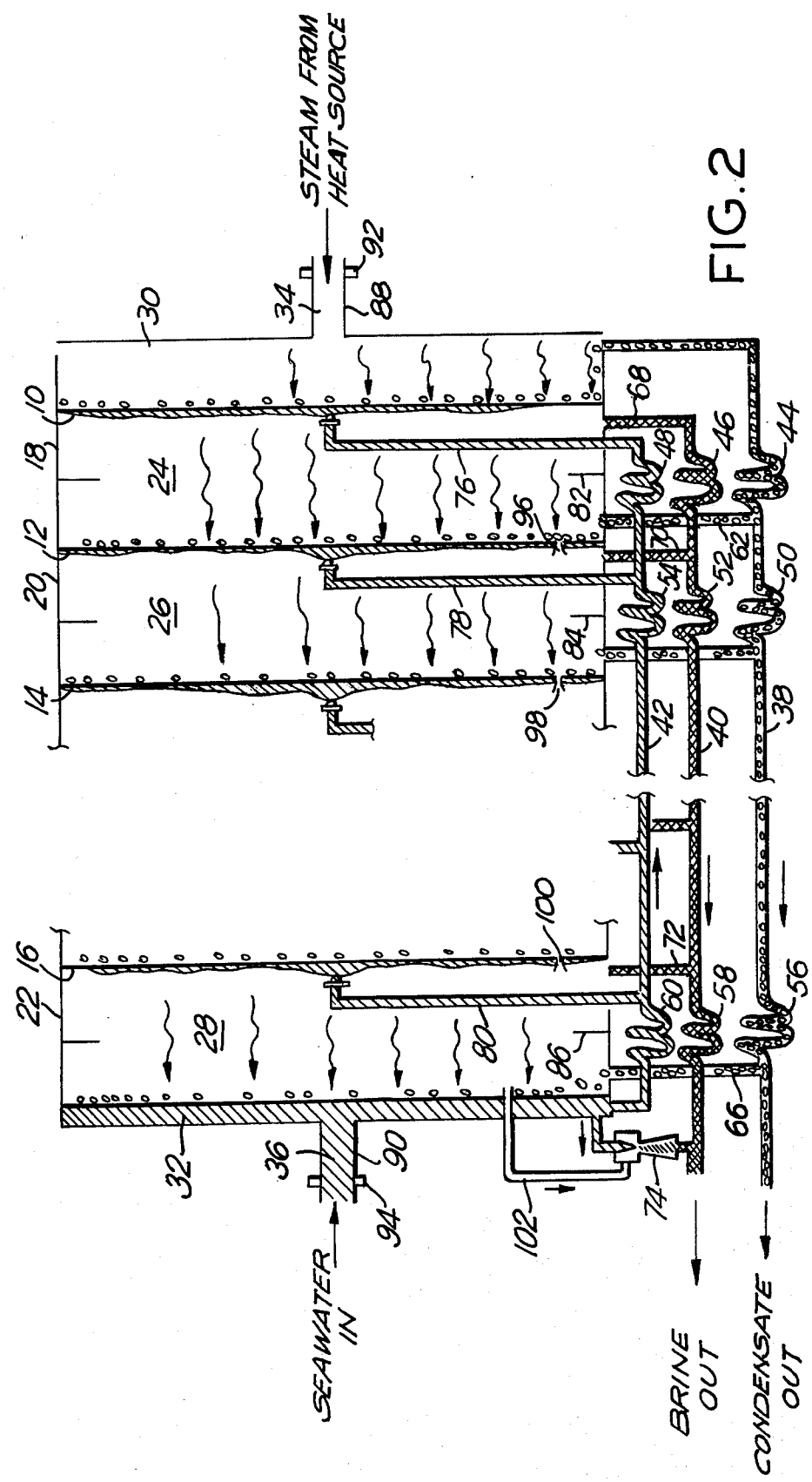
FIG. 2 is a diagrammatic illustration of a multi-effect rotary distillation unit in accordance with the invention showing the liquid and heat energy paths with the unit being arranged in a horizontal disposition.

Referring now more particularly to FIG. 2, apparatus according to the invention is diagrammatically illustrated there in a horizontal disposition and comprises a stack of a plurality of spaced, thin vertical circular sheets or discs 10, 12, 14 and 16 which may be made of any suitable heat conductive material such as metal, for example, copper. The sheets are joined by Y-frames 18, 20 and 22. The spaces between the stacked sheets form a plurality of adjoining separate successive inner chambers of stages 24, 26 and 28. Terminal chambers 30 and 32, provided with conduits 34 and 36 are disposed at opposite ends of the adjoining inner chambers. Steam or other heat energy from an external source (not shown) is introduced into chamber 30 through conduit 34 and liquid to be distilled, such as sea water, is introduced into chamber 32 through conduit 36. A plurality of manifolds 38, 40 and 42 provided with liquid-to-liquid heat exchangers 44, 46, 48, 50, 52, 54, 56, 58 and 60 are disposed on the external circumference of the device. Manifold 38 is directly connected to terminal chamber 30 and to each of the inner chambers 24, 26 and 28 through conduits 62, 64 and 66 which lead into the inner chambers in the vicinity of the condensing surfaces of the vertical circular sheets 10, 12 and 16, as explained more fully hereinafter. Manifold 40 is connected to each of the inner chambers 24, 26 and 28 through conduits 68, 70 and 72 which lead into the inner chambers 24, 26 and 28 in the vicinity of the evaporating surfaces of the vertical circular sheets 10, 12 and 16, as explained more fully below, and is connected to terminal chamber 32 by way of ejector 74. On the other hand, manifold 42 is directly connected to terminal chamber 32 and to each of the inner chamber 24, 26 and 28 through pressurized spray bars 76, 78 and 80 which extend into the inner chambers and open thereinto in the vicinity of a central axial line passing through the chambers, that is near the center line of rotation. A plurality of internal dividing means, such as rings 82, 84 and 86 are located on the circumferential Y-frames 18, 20 and 22. The above-mentioned conduits 34 and 36 form end shafts 88 and 90 which are fixed to the circular end plates of the terminal chambers 30 and 32. The shafts are provided with rotary seals 92 and 94 and are coupled to an external source of power (not shown) in any convenient manner so that the assembly can be rotated. Chambers 24, 26 and 28 are also provided with small bleed ports 96, 98 and 100 located between chambers which permit a small purge flow in the direction of lower pressure and thus prevent air concentration from building up in the chambers. In this connection, it is to be noted that the final low pressure stage or chamber 29 is bled to the atmosphere through ejector 74 by way of conduit 102.

Figure 3:
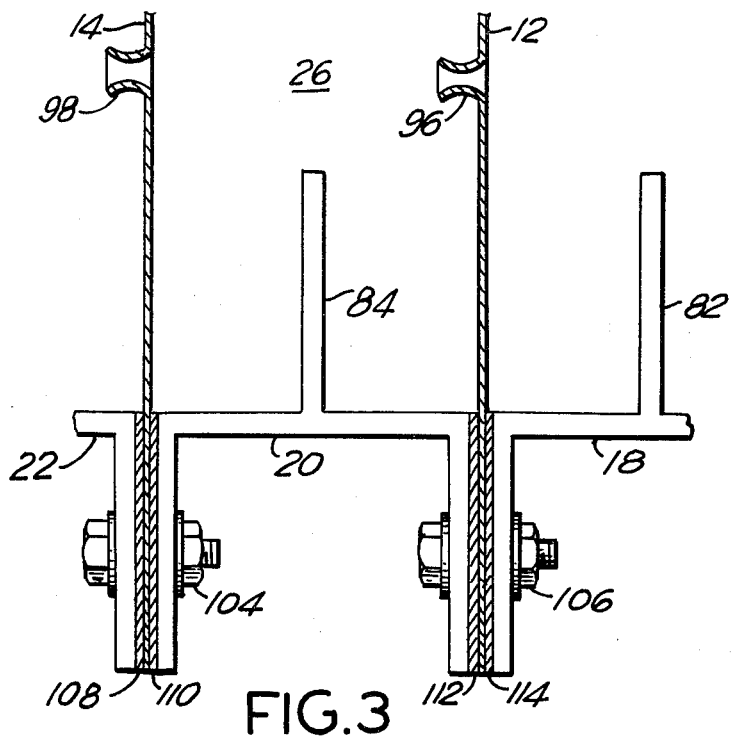
FIG. 3 is a diagrammatic illustration of a typical evaporation and condensation chamber assembly in accordance with the invention, showing in detail the Y-frame, heat conductive sheets circular sealer and connecting means therefrom in an assembled form.

As may be seen more particularly from reference to FIG. 3, a typical inner chamber 26 in assembled state includes circular metal sheets 12 and 14, Y-frame 20, bleed ports 96 and 98 internal ring 84 with Y-frame 20 being attached to neighboring Y-frames 18 and 22 by suitable connectors 104 and 106 and being provided with a plurality of circular seals 108, 110, 112 and 114 in order to prevent leakage.

Figure 5:
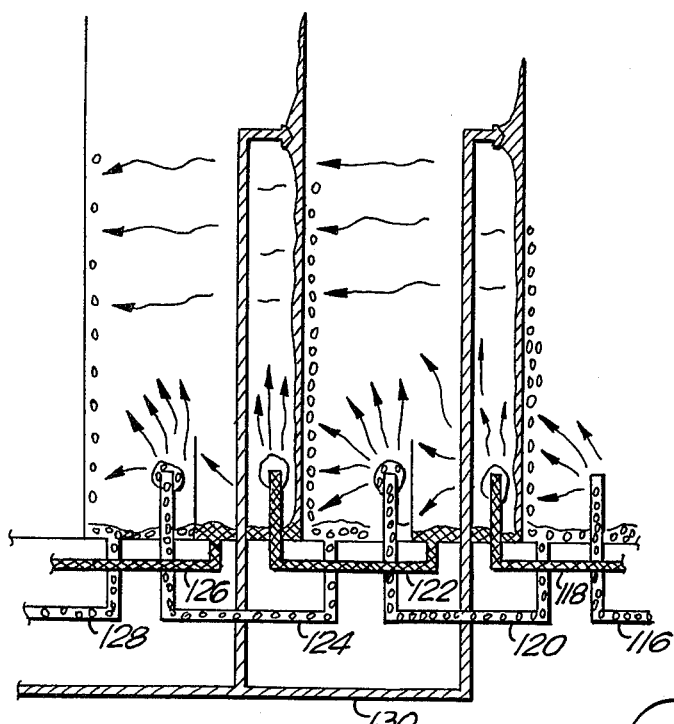
FIG. 5 is a preferred form of a pair of adjoining evaporation and condensation chambers in accordance with the invention as employed in a unit arranged in a horizontal disposition.

In an alternative and preferred embodiment of the invention, manifolds 38 and 40 and the heat exchangers associated therewith may be replaced as shown in FIG. 5 by "U" tubes 116, 118, 120, 122, 124, 126 and 128 which feed condensate and brine from each chamber into the next lower pressure chamber. In such an arrangement, the condensate and brine streams passing through the "U" tubes partially flash, giving up heat of vaporization to the chambers into which they lead and reducing the stream temperatures to substantially the same temperature as the condensate and brine presently existant in those chambers. The "U" tubes also serve as pressure equalizing means between chambers. It is to be noted, likewise, that the liquid-to-liquid heat exchangers in manifold 42 which supplies incoming seawater to the various chambers may be be eliminated, if desired, as shown at 130 in FIG. 5.

Figure 4:
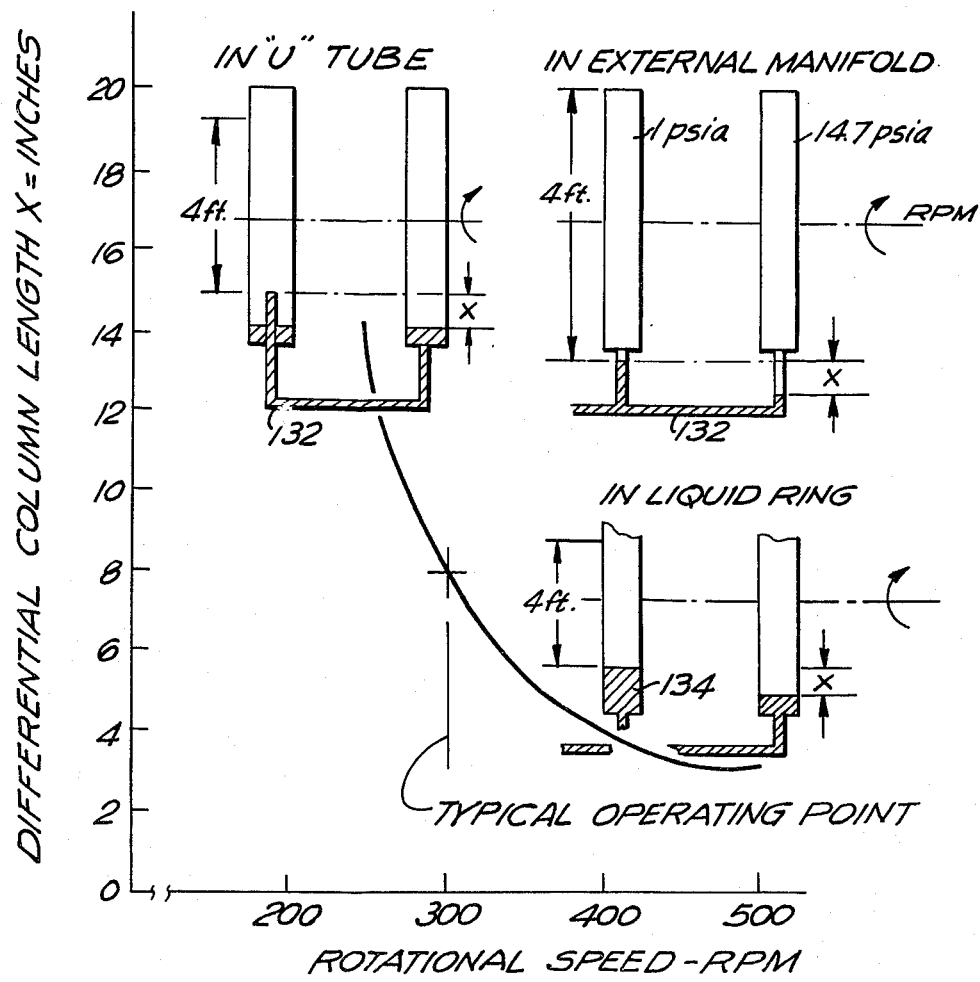
FIG. 4 is a graph illustrating the balancing of chamber pressures by rotational speed as a function of differential column length in a device in accordance with the invention.

In carrying out the inventive process with the apparatus of the invention, pressure and temperature differentials in successive chambers should be maintained and balanced. Each chamber is at successively lower temperatures and pressures in the direction of the flow of the heat. To insure maintenance of the essential pressure differential, vapor from the higher pressure chambers must be kept from the lower pressure chambers. At the same time, however, all of the chambers must be connected with fluid passages to recover condensate and brine. In order to accomplish the maintenance and balancing of the temperature and pressure differentials between the chambers or stages in accordance with the invention, the unit is subjected to rotational motion and thus to the centrifugal force produced thereby. Although the precise temperatures, and pressures and centrifugal force for any given distillation may vary widely and are readily determinable by simple calculation and experimentation, by way of example, in an apparatus being used to desalt sea water, assume the terminal temperatures are in a range of from about 212° F. to about 100° F. The pressure difference then between the first stage and last stage is approximately 14.7 p.s.i.a. minus 1.0 p.s i.a. or 13.7 p.s.i.a. Therefore, the assembly is rotated at a speed sufficient to provide a centrifugal force sufficiently strong to achieve the required pressure difference and, at the same time, as previously mentioned, to disperse thin films of distilland and to remove or collect condensate, as well as to form liquid rings and/or columns and balance the differential pressures between the chambers or stages and thus block or prevent vapor from moving from the higher pressure chambers to the lower pressure chambers. To be more explicit in this respect, attention is directed to FIG. 4 wherein the differential lengths of the columns between the first and last chamber for the assumed example is shown as a function of rotational speed for an apparatus according to the invention which has a diameter of 4 feet. As is evident from FIG. 4, the differential lengths of the columns between the first chamber and the other successive chambers increase in the direction of heat flow to the maximum length for the last chamber. In accordance with this invention, the liquid columns 132 can be present in the above-mentioned "U" tubes or manifolds as shown schematically in FIG. 4. On the other, the columns may be present as rotating liquid rings 134 within the chambers themselves, as also shown in FIG. 4.

In carrying out the process of the invention with an apparatus in accordance therewith, the presence of air in the chambers should at best be substantially completely eliminated and at least be maintained at a very low minimum in order to vaporize and condense a liquid, such as sea water, in accordance with the process. While air can initially be substantially completely eliminated by pulling a vacuum on the apparatus, it may still find its way into the chambers in a number of ways, that is by entrainment in the incoming sea water, as air dissolved in incoming sea water and leakage of air into the apparatus from the atmosphere. Entrained air can be eliminated by drawing incoming sea water from unagitated holding tank thereof. Dissolved air and air introduced through leakage, however, will enter the chambers and is eliminated through the bleed ports mentioned above since these ports permit a small purge flow in the direction of reducing pressure and thereby prevent the air concentration from building up. In the practice of this invention, the bleed mass flow rate required to compensate for dissolved air in the incoming sea water is generally less than one one-thousandth of the total vapor mass flow rate. Air leakage from the atmosphere is generally avoided to any appreciable degree by the internal positive pressure exerted on the Y-frames by the liquid rings and columns which equalize the chamber pressure differentials.

Considering FIG. 2 once again, it is seen that an apparatus in accordance with the invention has both two axial and two circumferential fluid flow paths. The two axial flow paths are the sea water input flow path and the heat energy input flow path which flow in countercurrent directions with respect to each other. On the other hand, the two circumferential flow paths are the brine output flow path and the condensate output flow path both of which flow in the same direction with each other and in the direction of reducing pressures and temperatures as does the heat energy input flow path. In the apparatus diagrammatically illustrated in FIG. 2, the output brine and condensate are collected in suitable circular vertical troughs (not shown).

Performance of an apparatus in accordance with this invention to achieve the instant process, neglecting sensible heat losses, parasitic power and sea water vapor pressure depression, is expressed by the following relationships:

$$Q \sim 1/N$$

and $$W \sim h_s A_f \Delta T_t$$

where
Q = energy required per unit of condensate generated
N = number of recuperating stages
W = condensate generated per unit time
$h_s$ = stage to stage heat transfer coefficient
$A_f$ = frontal area of unit
$T_t$ = terminal temperature difference Consequently, maximizing both the number of recuperating stages and the stage to stage heat transfer coefficient, by employing thin film evaporating and condensing surfaces and by rotating the assembly, as previously mentioned at a speed sufficient to provide a centrifugal fume sufficiently strong to achieve the required pressure difference and, at the same time to generate the thin films of distilland and to remove or collect condensate, as well as to form liquid rings and/or columns and balance the differential pressures between the chambers or stages, minimizes the energy requirement and maximizes the condensate production rate for a given size unit operating at a given terminal temperature difference.

A typical stage to stage heat transfer coefficient for the process of this invention is generally on the order of 2000 to 3000 Btu/hr-ft²-°F. Current distillation units using pool boiling produce stage to stage heat transfer coefficients having an order of magnitude lower than these values when operating at stage to stage temperature differences of approximately 20° F. When operating at stage to stage temperature differences of 3° F., as in the instant process, pool boiling units produce stage to stage heat coefficients two orders of magnitude lower than those of the instant process.

To illustrate the condensate production capacity for the instant process, a 4 ft. diameter, 30 stage unit (approximately 5 ft. long), operating over a terminal temperature difference of 100° F. (waste heat or solar energy heat fired unit) can produce on the order of 500 gallons/hr of condensate with a specific heat requirement (including sensible heat loss) on the order of 40 Btu/lb of condensate produced. At terminal temperature differences of 300° F. (fossil fired units), the specific energy requirement is on the order of 30 Btu/lb for 1500 gallons/hr of condensate produced.

The size and portability of a typical unit lends itself to mass factory production. This reduces plant project cost uncertainties by eliminating a major portion of the on-site construction costs. The instant process can be used economically in either small or large (up to millions of gallons per day) plant applications by using multiple units in parallel. This approach, moreover, permits continuous operation at high output capacity (essential for a solar energy fired plant) while shutdown and maintenance is performed on individual units. Furthermore, even with one cycle of distillation, high purity condensate is produced with minimum salt carryover. This is to since the small stage to stage temperature differences (on the order of 3° F.) produce true evaporation rather than violent boiling on the evaporating surfaces. Obiously, the multiple units can be tied in series for producing multi-distilled condensate.

Referring now more particularly to FIG. 6, there is illustrated there diagrammatically a preferred form of the apparatus of this invention arranged in a vertical disposition, a partial view of a vertically disposed chamber being shown in detail in FIG. 7. As can be seen in FIG. 6, the apparatus comprises a plurality of separate successive inner chambers 134, 136, 138, 140 and 142 which correspond in construction to inner chambers or stages 24, 26 and 28 of the apparatus illustrated in FIG. 2. In addition, the apparatus includes terminal chambers 144 and 146 which are provided with conduits 148 and 150 disposed at opposite ends of the adjoining inner chambers and which conduits in turn are supported in suitable bearing means 152 and 154, so that the assembly may be rotated through an external source of power (not shown). Conduits 148 and 150 are inturn connected to non-rotable lines 156 and 158, respectively, which in turn are supported in conveniently suitable support members 160 and 162, the lines and conduits being provided at their junctures with circular seals 164 and 166 to prevent leakage.

As illustrated conduits 148 and 150 are connected to an axial centrally located conduit section 168 provided with a plurality of openings 170, 172, 174, 176, 178, 180, 182 and 184. Openings 182 and 184 are isolated from the other openings by means of sealing rings 186 and 188. In addition, the apparatus is provided with an ejector 190, connected to lines 192, 194 and 196, the latter line 196 being connected to the lowest temperature and pressure chamber 142 in the system in the vicinity of the vaporization surface 198 of that chamber. Line 194 opens into a stationary circular through 200 into which it delivers concentrated brine which is then taken out of the system by way of conduit 202 to be further used or simply discarded. Chamber 142 is also provided with a line 204 which delivers condensate water from the system to a second stationary trough 208 from which the water is delivered to storage or use through line 210.

Each of the chambers 134, 136, 138, 140 and 142 is provided with circular rings 212, 214, 216, 218 and 220 corresponding to the circular rings 82, 84 and 86 as shown in FIG. 2 and also with bleeders 222, 224, 226 and 230 corresponding to bleeders 96, 98, 100 as shown in FIG. 2. Finally, as shown in FIG. 6, the various chambers are provided with a plurality of "U" tubes 232, 234, 236, 238, 240, 242, 244, 246 and 248 which correspond to the "U" tube 132 shown diagrammatically in FIG. 4. Each inner chamber is provided with two "U" tubes. One "U" tube leads from the vicinity of the evaporating surface of a given chamber to the vicinity of the evaporating surface of the next succeeding chamber and the other leads from the vicinity of the condensing surface of a given chamber to the vicinity of the condensing surface of the next chamber. As may further be seen from FIG. 6, a plurality of liquid rings such as shown by numeral 250 are formed in the various chambers towards the circumference of the apparatus due to the rotating motion of the device, these rings being progressively longer in successive chambers going towards the chamber of lower temperature and pressure.

In order to divert the flow of sea water into the apparatus in the proper direction, terminal chamber 146 is also provided with a circular dividing ring 252 which extends from the central axis of the device and terminates just short of the outer circumference of the chamber.

Returning once again to FIG. 2, the apparatus diagrammatically shown there operates as follows:

The unit is rotated by means of an external source of power (not shown) at a suitable speed, such as, for example, 300 revolutions per minute and steam from an external source and as a source of heat energy is introduced into terminal chamber 30 by way of conduit 34 while sea water is introduced into terminal chamber 32 by way of conduit 36. The steam condenses on the surface of sheet 10 with which it comes into contact, the heat liberated therefrom condensation being transferred through sheet 10 to the opposite surface thereof which acts as an evaporating surface. Condensed steam from terminal chamber 30 passes out of the apparatus through manifold 38 and heat exchangers 44, 50 and 56. In the meantime, sea water from terminal chamber 32 is introduced into chambers 24, 26, and 28 through manifold 42 and heat exchangers 48, 54 and 60 by way of spray bars 76, 78 and 80 where it is sprayed as a thin film across the evaporating surfaces of sheets 10, 12 and 16 where it evaporates.

As a result of evaporation, vapor is generated in each of the chambers and moves through the chambers from the evaporating surfaces of the sheets to the condensing surfaces of the next downstream sheets where the vapor condenses and the heat is transferred by way of the sheets to the opposite surfaces thereof which act as evaporating surfaces.

While the above events are taking place, condensed vapor is led from chambers 24, 26 and 28 into manifold 38 where it is joined by steam condensate from terminal chamber 30 and thus out of the apparatus for collection or use. On the other hand, concentrated brine, that is, the residue of the sea water originally introduced into chambers 24, 26 and 28 is removed from those chambers through conduits 68, 70 and 72 and passes out through manifold 40 and heat exchangers 46, 52 and 58. At the same time sea water from chamber 32 is likewise being ejected through ejector 74 which is connected to manifold 40 and joins the concentrated brine which is simply led out of the device for either recycling thereto or discarded.

As previously mentioned hereinabove, it is necessary that the presence of air in the apparatus should be kept as low as possible and, ideally, should be substantially completely eliminated. Consequently, any air which is led into the system as dissolved air in the sea water or through leakage from the atmosphere, or in ay other manner, is removed through bleeders 96, 98 and 100 and in the final chamber of lowest pressure and temperature this air passes by way of line 102 through ejector 74 and then into manifold 40 where it is led out of the system with the concentrated brine. Both the condensate exiting the apparatus through manifold 38 and the concentrated brine exiting the apparatus through manifold 40 are collected in separate stationary troughs (not shown) and removed therefrom in any convenient manner.

As previously mentioned above, during the described activities the temperature differentials between the inner chambers is about 3° F. per stage. Moreover, in the assumed example mentioned above the terminal temperature differential is approximately 100° F., the terminal temperature in terminal chamber 30 being 212° F. and the terminal temperature in terminal chamber 32 being about 100° F. with the sea water, if necessary, being heated, as needed, to bring it to about 100° F. Thus, there are approximately 30 stages affording approximately a 3° F. temperature differential from stage to stage in the operation of the device as may be seen from an analysis of the graph of FIG. 1.

Returning now to FIG. 6, the rotary distillation unit diagrammatically illustrated there operates generally in the same manner as the apparatus of FIG. 2 having, however, a somewhat different flow pattern since it is arranged in a vertical disposition. In the apparatus of FIG. 6, sea water is led into the apparatus by way of line 158, passing into conduit 150 through openings 184 in that conduit and into terminal chamber 146 where it flows out toward the circumferential limits of the terminal chamber and thence back toward the central axis of the device, being so guided by the circular separating panel or means 252 disposed in terminal chamber 146. As the sea water flows back toward the central axis of the apparatus, it passes through openings 170, 172, 174, 176, 178 and 180 in conduit 168 and thence into chambers 134, 136, 138, 140 and 142 where it undergoes vaporization and condensation as described hereinabove in the operation of FIG. 2 apparatus. As evaporation and condensation take place, in chamber 134 brine concentrate passes through "U" tube 242 into chamber 136 and condensate likewise passes from chamber 134 into chamber 136 by way of "U" tube 244. Moreover, as can be seen, the flow path of brine from chamber 136 to 138 takes place by way of "U" tube 234; whereas, the flow of condensate from chamber 136 into 138 takes place through "U" tube 236. This pattern repeats itself until condensate and brine reach chamber 142, that is the chamber of lowest temperature and pressure. From that chamber, condensate passes by way of line 204 into circular stationary through 208 where it is collected for use by way of conduit 210. At the same time these events are occurring, concentrated brine is removed from the apparatus by way of line 196 which leads into line 194 and is then delivered to stationary circular through 200, being removed therefrom through conduit 202 for either recycling, or discarded. It is to be noted that air is removed from the apparatus through bleeders 222, 224, 226, 228 and 230 passing from chamber 232 by way of ejector 190 which is connected by conduit 192 to conduit 150 delivering sea water to the apparatus.

As can be seen from FIG. 6, heat energy such as steam or any other convenient source of heat is delivered to the apparatus by way of conduit 156 into conduit 148 and by way of opening 182 into terminal chamber 144. From that chamber condensate which is formed as a result of the steam giving up its heat of vaporization is transferred into chamber 134 by way of "U" tube 232 where it joins other condensate being formed in chamber 134 and then it progresses through the system as above explained along with that condensate eventually being led therefrom into through 208.

As previously memtioned, in carrying out the process of this invention with the apparatus thereof any source of heat energy may be employed, the same being obtained from an external source which may be steam, fossil fuels or solar energy.

Numerous advantages of this invention, in addition to those particularly mentioned above, will be readily apparent to those skilled in the art. Moreover, many variations of the described process and apparatus may be made without departing from the spirit and scope of this invention. It is to be understood, therefore, that this invention is not to be limited to the described embodiments set forth above, except as defined in the appended claims.

What is claimed is:

1. A thermally driven, multi-effect distillation process comprising the steps of:
   (a) introducing liquid to be distilled into a plurality of evaporating and condensing stages and forming thin film evaporating and condensing layers of said liquid in said plurality of stages while passing heat energy through said plurality of stages in a direction countercurrent to the flow of liquid into said stages,
   (b) evaporating the liquid in each of said stages and forming condensate and distilland thereof while transferring substantially all of the heat of condensation therefrom to the next downstream evaporating and condensing stage and while maintaining a minimum temperature differential of about 3° F. between each stage of said plurality of stages, and
   (c) separately removing the condensate and distilland from each of said stages while rotating said stages about an axis which passes through the points of introduction to said stages of said liquid to be distilled and said heat energy, at a speed of rotation at least sufficient to generate a centrifugal force and disperse said thin films of said distilland, collect said condensate, generate rings or columns of said liquid in said stages and balance and maintain the differential pressures between said stages.

2. A process according to claim 1 wherein steam is employed as the source of heat energy.

3. A process according to claim 1 wherein the liquid is sea water.

* * * * *